Figure 1:
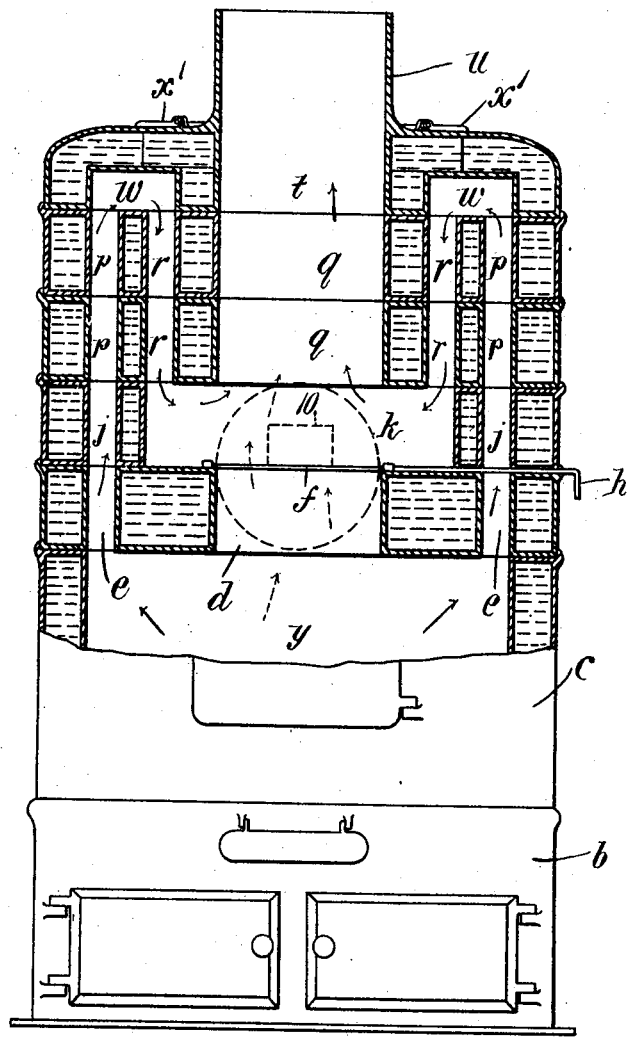

No. 782,976. PATENTED FEB. 21, 1905.
P. T. LYONS.
WATER HEATER.
APPLICATION FILED MAY 21, 1904.

5 SHEETS—SHEET 1.

Witnesses
Alex Currie

Patrick T. Lyons
Inventor
By Attorney

No. 782,976. PATENTED FEB. 21, 1905.
P. T. LYONS.
WATER HEATER.
APPLICATION FILED MAY 21, 1904.
5 SHEETS—SHEET 2.
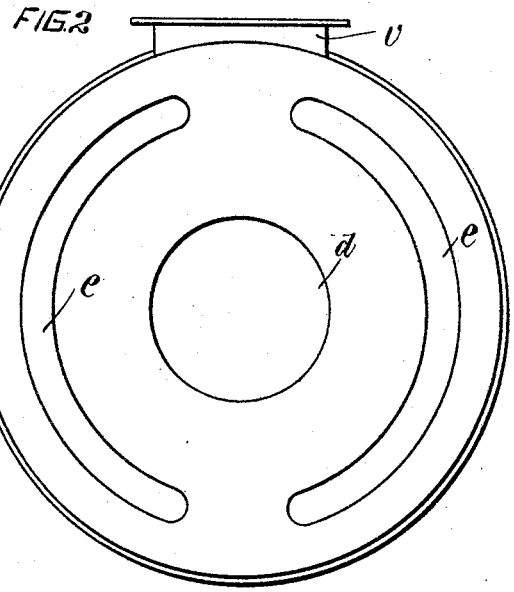
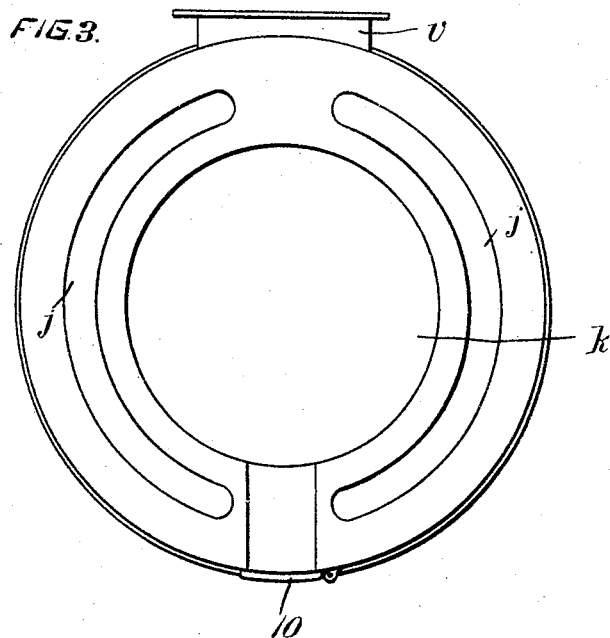
Witnesses
Alex Currie
Patrick T. Lyons
Inventor
By Attorney No. 782,976. PATENTED FEB. 21, 1905.
P. T. LYONS.
WATER HEATER.
APPLICATION FILED MAY 21, 1904.
5 SHEETS—SHEET 3.
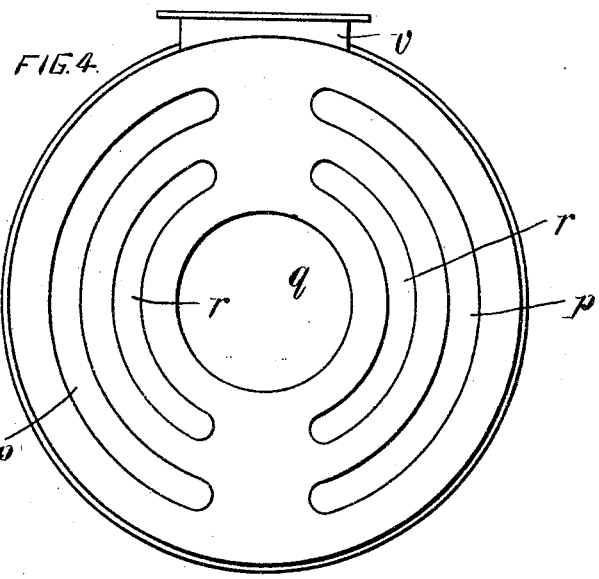
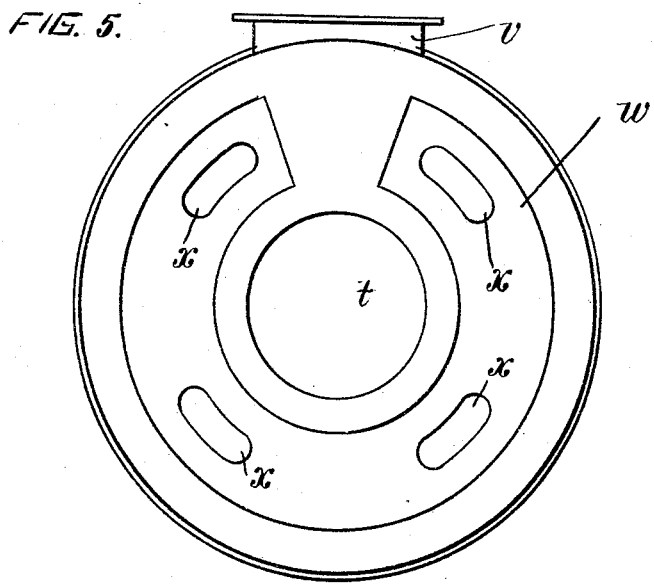

No. 782,976. PATENTED FEB. 21, 1905.
P. T. LYONS.
WATER HEATER.
APPLICATION FILED MAY 21, 1904.
5 SHEETS—SHEET 4.
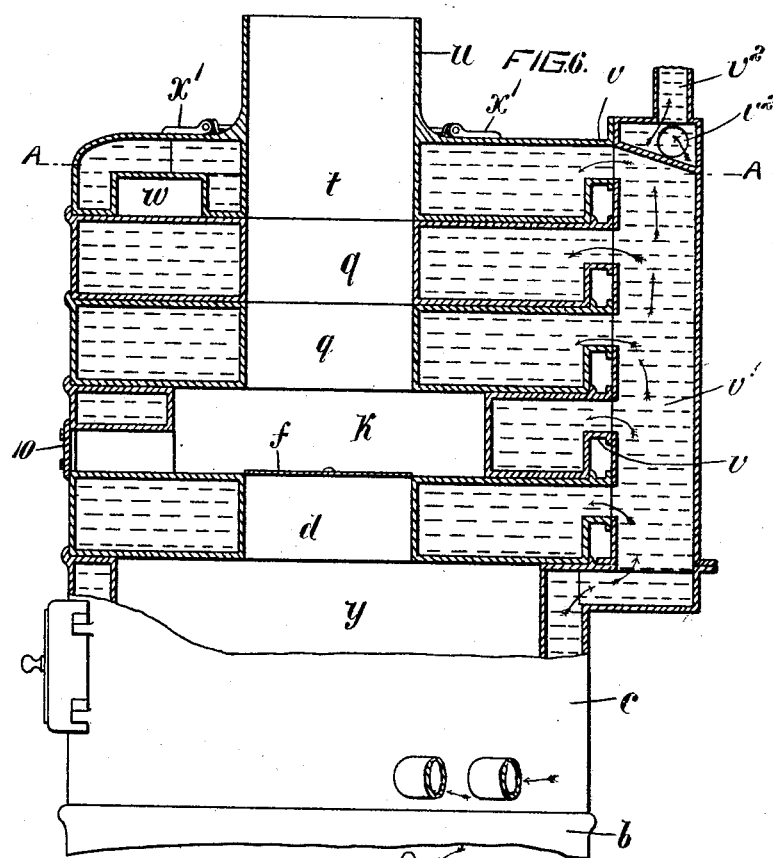
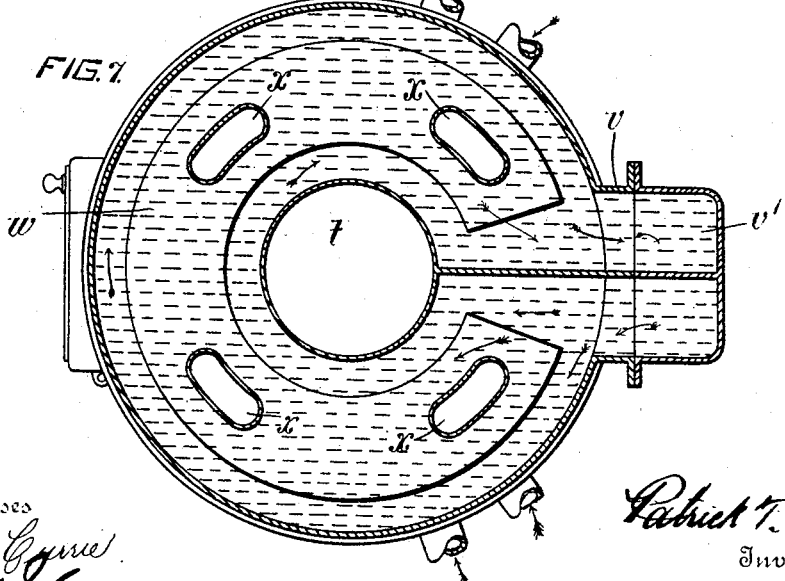

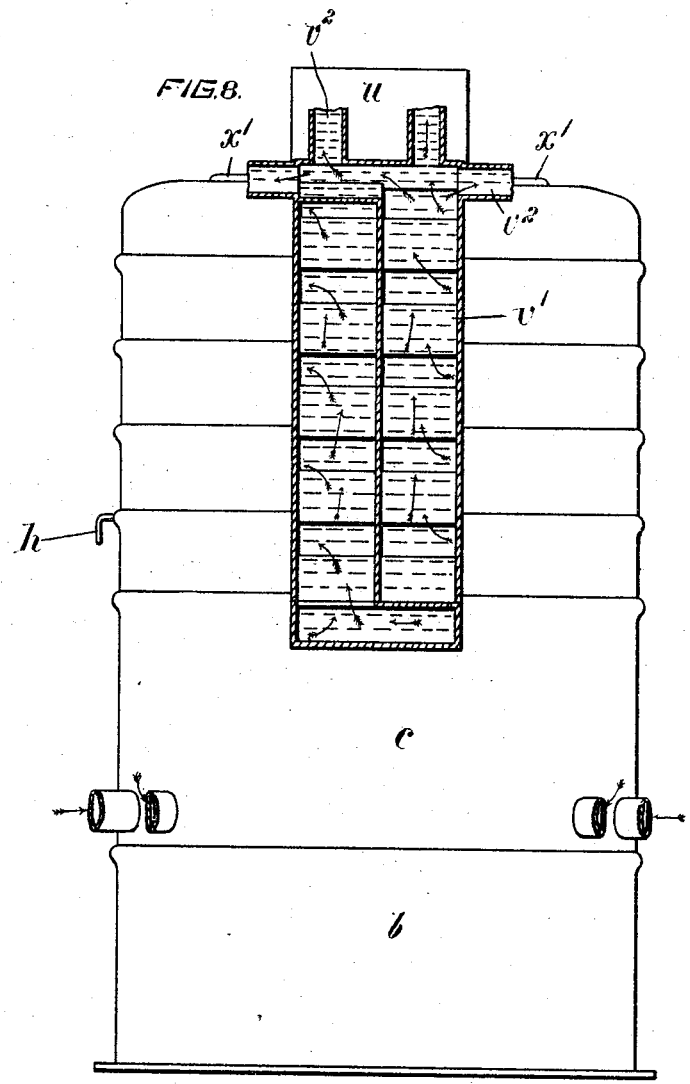

No. 782,976. Patented February 21, 1905.

UNITED STATES PATENT OFFICE.

PATRICK THOMAS LYONS, OF MONTREAL, CANADA.

WATER-HEATER.

SPECIFICATION forming part of Letters Patent No. 782,976, dated February 21, 1905.

Application filed May 21, 1904. Serial No. 209,076.

*To all whom it may concern:*

Be it known that I, PATRICK THOMAS LYONS, of the city of Montreal, Canada, (whose post-office address is Galt avenue, Verdun, district of Montreal, Province of Quebec, Canada,) have invented certain new and useful Improvements in Water-Heaters; and I do hereby declare that the following is a full, clear, and exact description of the same.

My invention relates particularly to the draft-flues of water-heaters or boilers, and the broad principle thereof can be applied with advantage to other types of fluid-heaters, such as steam-generators and air-heaters.

My invention has for its object to locate the distributing-point of a water-heater in the hottest portion, to accelerate the draft therethrough, to increase the heating-surface, and enable a direct draft to be provided at will.

The invention may be said, briefly, to consist of a water-heater having a combustion-chamber, a chimney connection centrally of the top of the heater, and a flue leading from the combustion-chamber upwardly, then horizontally, then downwardly, then horizontally, and upwardly centrally of the heater to the chimney connection, the central flue being preferably adapted to communicate at its lower end with the combustion-chamber and controlled by a damper.

For full comprehension, however, of my invention reference must be had to the accompanying drawings, forming a part of this specification, in which similar reference characters indicate the same parts, and wherein—

Figure 1 is a longitudinal vertical section view of a sectional water-heater constructed according to my invention. Fig. 2 is a plan view of the under side of the first section above the combustion-chamber or fire-pot. Fig. 3 is a similar view of the second section above the combustion-chamber or fire-pot. Fig. 4 is a similar view of one of the intermediate sections. Fig. 5 is a similar view of the top section. Fig. 6 is a side elevation, partly in section, being taken on an axial plane extending from front to rear. Fig. 7 is a horizontal sectional view taken on line A A, Fig. 6; and Fig. 8 is a rear elevation with the water-post in section.

The ash-pit section $b$ and fire-pot or combustion-chamber section $c$, resting thereon, may be of the construction usually employed in building hot-waters heaters. The first section above the fire-pot section has, according to my invention, a central circular aperture $d$ and a pair of segmental apertures $e$, concentric to the central aperture, and a damper $f$, adapted to control this central aperture, is pivoted to the top of this section, such damper being controlled by a handle $h$. The next section is formed with a pair of segmental apertures $j$, corresponding to and registering with the apertures $e$ in the first section, and this section also has a central circular aperture $k$ of greater diameter than the central aperture $f$ in the first section and constituting a communicating-flue between the apertures $r$ and $q$, to be presently described. The sections between that last described and the top are each formed with a pair of segmental apertures $p$, corresponding to and registering with the apertures $j$ in the section beneath it, a central aperture $q$, before mentioned and communicating with $k$, and a pair of segmental apertures $r$, also before mentioned and also communicating with $k$, while the top section is provided with a substantially annular recess $w$, communicating with the tops of the series of apertures $p$ and $r$, and a central aperture $t$, corresponding to the apertures $q$ and $k$, this last-mentioned section having a chimney connection $u$. Each of these horizontal water-sections has a header $v$, whereby the flow and return connections are effected, as usual, by means of a water-port $v'$, having the flow or feed pipes $v^2$ leading therefrom, while the return-pipes lead to the usual water-jacket of the fire-pot or combustion-chamber, a series of cleaning-holes $x$ being provided in the top section, such holes being closed, preferably, by covers $x'$, and the second section above the fire-pot or combustion-chamber section is formed with a cleaning-aperture having a door 10. When in operation and a full draft is desired, the damper should be turned to the position shown in dotted lines, thereby effecting a direct-draft connection between the fire-chamber $y$ and the chimney, while if it is desired to utilize the full efficiency of the heater this damper is closed, thereby causing the gases of combustion to be drawn upwardly through the series of segmental apertures $e$, $j$, and $p$, along the flue constituted by the annular recess $w$, down segmental apertures $r$, and along the flue constituted by the space provided by the central opening $k$, and finally up the central flue to the chimney.

The main advantage attendant upon this construction of heater is that the gases of combustion when in their hottest state are caused to impinge upon the lower heating-surface of the top section, thereby causing such gases to give up a large proportion of their heat to such section and making the latter the hottest section in the furnace, and the water which is drawn for distribution from this section will be distributed when at its highest temperature.

My heater can be constructed of less height than hot-water heaters heretofore in use, because the water-sections rest directly one upon the other and also because of the length of my tortuous flue, both of these features serving to prevent loss of the heat emanated from the fire, while owing to its flues which first draw from the combustion-chamber being located near the periphery thereof and constituting collectively an approximately complete annular flue the combustion tends toward the side, thereby preventing the dead side portions of a fire-bed or other source of heat usually found in furnaces of this type.

The path of the water or other fluid as it circulates through the heater illustrated is as shown in Figs. 6, 7, and 8, although the invention can be applied with advantage to other types of heaters without departing from the spirit of my invention.

I claim—

1. A sectional water-heater for supplying a heat-radiating medium to a heat-distributing system, such heater having flow and return connections for effecting communication with the heating system, and a combustion-chamber, a chimney connection centrally of the top of the heater, a flue leading from the interior of the combustion-chamber upwardly, horizontally, downwardly, horizontally and upwardly centrally of the heater to the chimney connection, and water-containing means forming the walls of the entire central portion of such flue.

2. A sectional water-heater for supplying a heat-radiating medium to a heat-distributing system, such heater having flow and return connections for effecting communication with the heating system, and a combustion-chamber, a chimney connection centrally of the top of the heater, a flue leading from the interior of the combustion-chamber upwardly, horizontally, downwardly, horizontally and upwardly centrally of the heater to the chimney connection, water-containing means forming the walls of the entire central portion of such flue the said central portion of the flue having an extension leading downwardly to and communicating with the interior of the combustion-chamber section, and a damper whereby the downwardly-extending portion of the central flue is controlled.

3. In a water-heater, a series of water-sections combining a combustion-chamber section, a top water-section, and a series of intermediate water-sections supported upon the combustion-chamber section and supporting the top section, each of the intermediate water-sections having a vertical aperture near the periphery thereof and adapted to register with one another and form a vertical flue, the intermediate water-sections excepting the lowermost and next to lowermost being each formed with a vertical aperture adjacent to the first-mentioned aperture and between the latter and the center of the section, the last-mentioned apertures being adapted to register with one another and form a second vertical flue, each of the intermediate sections and the top water-section being formed with a central aperture, the central apertures being adapted to register with one another and form a third vertical flue, means effecting a communication between the upper ends of the first and second vertical flues, and means effecting a communication between the lower ends of the second and third vertical flues, substantially as described and for the purpose set forth.

4. In a water-heater, a series of water-sections comprising a combustion-chamber section, a top water-section having a chimney connection, and a series of intermediate water-sections supported upon the combustion-chamber section and supporting the top section, such intermediate and top water-sections being formed with a series of apertures adapted to conjointly form a flue leading from the interior of the combustion-chamber section upwardly, horizontally, downwardly, horizontally, and upwardly centrally of the sections to the chimney connection, the central portion of the flue having an extension leading downwardly to and communicating with the interior of the combustion-chamber section, and a damper whereby the central portion of the flue is controlled.

5. In a water-heater, a series of water-sections combining a combustion-chamber section, a top water-section, and a series of intermediate water-sections supported upon the combustion-chamber section and supporting the top section, each of the intermediate water-sections having a vertical aperture near the periphery thereof and adapted to register with one another and form a vertical flue, the intermediate water-sections excepting the lowermost and next to lowermost being each formed with a vertical aperture adjacent to the first-mentioned aperture and between the latter and the center of the section, the last-mentioned apertures being adapted to register with one another and form a second vertical flue, each of the intermediate sections and the top water-section being formed with a central aperture, the central apertures being adapted to register with one another and form a third vertical flue, the top section having a substantially annular recess in its under side and effecting a communication between the first and second vertical flues, the next to lowermost intermediate section having its central aperture of sufficient diameter to effect a communication between the second and third vertical flues, substantially as described and for the purpose set forth.

6. In a water-heater, a series of water-sections comprising a combustion-chamber section, a top water-section, and a series of intermediate water-sections supported upon the combustion-chamber section and supporting the top section, each of the intermediate water-sections having a vertical aperture near the periphery thereof and adapted to register with one another and form a vertical flue, the intermediate water-sections excepting the lowermost and next to lowermost being each formed with a vertical aperture adjacent to the first-mentioned aperture and between the latter and the center of the section, the last-mentioned apertures being adapted to register with one another and form a second vertical flue, the next to lowermost intermediate section and the sections above the same being formed with central apertures adapted to register with one another and form a third vertical flue such next to lowermost intermediate section having a cleaning-aperture with a door, the top section having a substantially annular recess in its under side and effecting a communication between the first and second vertical flues, the next to lowermost intermediate section having its central aperture of sufficient diameter to effect a communication between the second and third vertical flues, substantially as described and for the purpose set forth.

7. In a water-heater, a series of water-sections combining a combustion-chamber section, a top water-section and a series of intermediate water-sections supported upon the combustion-chamber section and supporting the top section, each of the intermediate water-sections having a pair of vertical segmental apertures near its periphery, such apertures being adapted to register with one another and form a vertical flue, the intermediate water-sections excepting the lowermost and next to lowermost being each formed with a second pair of vertical segmental apertures adjacent to the first-mentioned apertures and between the latter and the center of the section, the series of apertures in each of the last-mentioned sections being adapted to register with one another and form a second vertical flue, the intermediate water-sections and the top water-section being formed with central apertures adapted to register with one another and form a third vertical flue, the top section having an approximately annular recess in its under side effecting a communication between the first and second vertical flues, the next to lowermost intermediate section having its central aperture of sufficient diameter to effect a communication between the second and third vertical flues, and a damper controlling the lower end of the central flue, substantially as described and for the purpose set forth.

In testimony whereof I have affixed my signature in presence of two witnesses.

PATRICK THOMAS LYONS.

Witnesses:
WILLIAM P. MCFEAT,
FRED J. SEARS.